(12) United States Patent
Yamashita et al.

(10) Patent No.: US 11,458,863 B2
(45) Date of Patent: Oct. 4, 2022

(54) VEHICLE

(71) Applicant: SUBARU CORPORATION, Tokyo (JP)

(72) Inventors: Susumu Yamashita, Tokyo (JP); Takahiro Kinoshita, Tokyo (JP); Yusuke Komatsu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/480,818

(22) Filed: Sep. 21, 2021

(65) Prior Publication Data

US 2022/0097564 A1 Mar. 31, 2022

(30) Foreign Application Priority Data

Sep. 28, 2020 (JP) .............................. JP2020-162150

(51) Int. Cl.
| | |
|---|---|
| *B60L 58/20* | (2019.01) |
| *B60L 50/52* | (2019.01) |
| *B60K 6/26* | (2007.10) |
| *B60K 6/48* | (2007.10) |

(52) U.S. Cl.
CPC ............... *B60L 58/20* (2019.02); *B60K 6/26* (2013.01); *B60K 6/48* (2013.01); *B60L 50/52* (2019.02); *B60L 2210/10* (2013.01); *B60L 2240/526* (2013.01); *B60L 2240/527* (2013.01); *B60L 2240/547* (2013.01)

(58) Field of Classification Search
CPC combination set(s) only.
See application file for complete search history.

(56) References Cited

U.S. PATENT DOCUMENTS

| 11,332,001 | B2* | 5/2022 | Wang ..................... B60W 20/50 |
| 2017/0089104 | A1* | 3/2017 | Kowalewski ........... E05B 81/82 |
| 2017/0106756 | A1* | 4/2017 | Xu ......................... H02M 3/158 |
| 2017/0210233 | A1* | 7/2017 | Yu .......................... H02M 3/155 |

(Continued)

FOREIGN PATENT DOCUMENTS

| JP | 2002262534 A * | 9/2002 | ............... B60K 6/26 |
| JP | 2018-037059 A | 3/2018 | |
| WO | WO-2018043107 A1 * | 3/2018 | ............. B60R 16/02 |

*Primary Examiner* — Adam D Houston
(74) *Attorney, Agent, or Firm* — McDermott Will & Emery LLP

(57) ABSTRACT

A vehicle includes a high-voltage system circuit including a high-voltage battery, a low-voltage system circuit including an updater and a low-voltage battery having a lower output voltage than the high-voltage battery, a DC-DC converter coupled between the two circuits, a controller that controls the two circuits and the DC-DC converter, and a wireless communication device. The updater updates a program of an update-target device. The wireless communication device wirelessly receives update data for the program. The controller calculates time taken for updating the program, based on information on the update data. The controller causes the DC-DC converter to reduce in voltage output electric power of the high-voltage battery and then supply the electric power to the low-voltage system circuit, and thus charges the low-voltage battery in accordance with the calculated time. The updater updates the program using output electric power of the charged low-voltage battery.

8 Claims, 6 Drawing Sheets

(56) References Cited

U.S. PATENT DOCUMENTS

| | | | |
|---|---|---|---|
| 2017/0274777 A1* | 9/2017 | Alam | B60L 50/61 |
| 2018/0154786 A1* | 6/2018 | Wang | B60L 53/14 |
| 2018/0154787 A1* | 6/2018 | Chen | B60W 50/082 |
| 2018/0215269 A1* | 8/2018 | Alam | B60L 3/003 |
| 2019/0193653 A1* | 6/2019 | Nakamura | G06F 9/4893 |
| 2021/0094441 A1* | 4/2021 | Sampson | H01M 10/44 |
| 2021/0354589 A1* | 11/2021 | Wand | B60L 58/18 |
| 2021/0402979 A1* | 12/2021 | Ono | B60L 58/18 |
| 2022/0048495 A1* | 2/2022 | Cho | B60K 6/387 |
| 2022/0097564 A1* | 3/2022 | Yamashita | B60K 6/26 |
| 2022/0097565 A1* | 3/2022 | Komatsu | B60L 58/20 |
| 2022/0097672 A1* | 3/2022 | Komatsu | B60W 10/08 |
| 2022/0097673 A1* | 3/2022 | Ohama | B60W 10/08 |
| 2022/0118844 A1* | 4/2022 | Golder | B60K 6/48 |

* cited by examiner

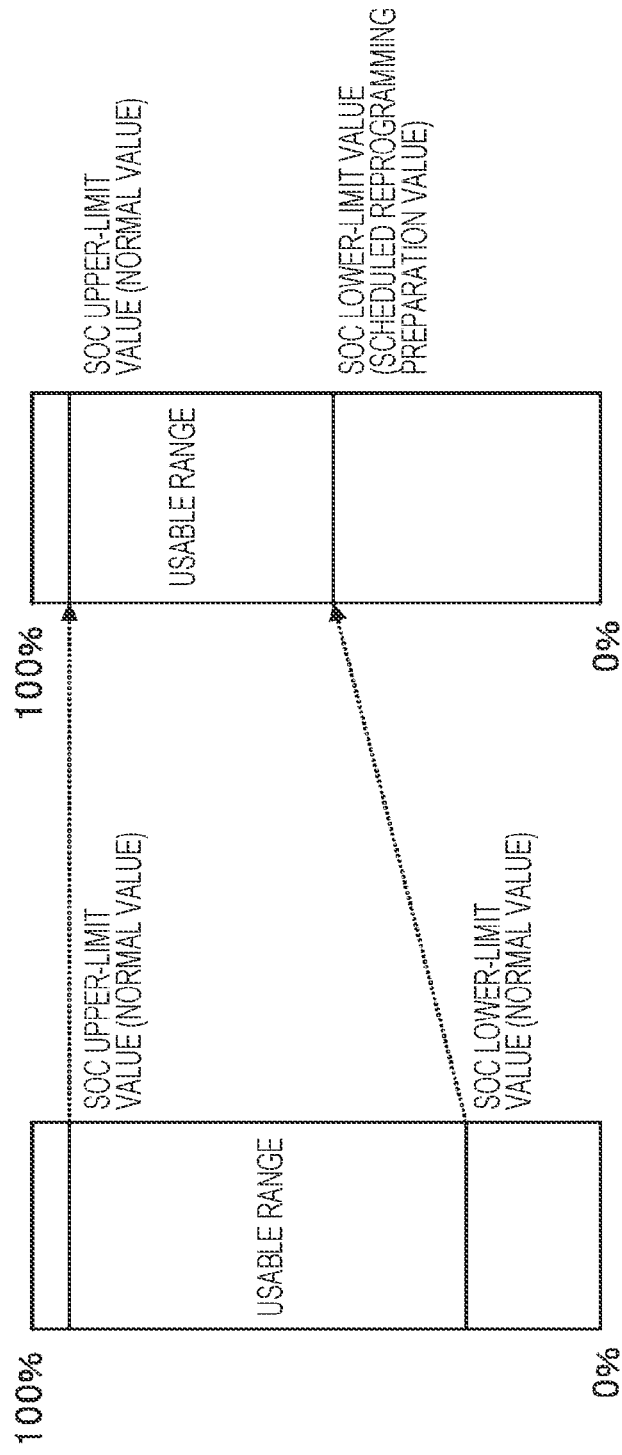

FIG. 4A

24a
Update the program(s)?
* * * * * * * * * * * *
Vehicle is not usable until the update of the program(s) ends
* * * * * * * * * * * *

YES    NO

| Update-Target Program | Expected Time | Select |
|---|---|---|
| Program A | 0:30 | ☑ |
| Program B | 0:30 | ☐ |
| Program C | 2:30 | ☑ |
| Program D | 1:30 | ☐ |

Select Program(s)    Cancel

Expected Total Time  3:00
* * * * * * * * * * * *
Vehicle is not usable until the update of the program(s) ends
* * * * * * * * * * * *

◄    MM/DD XX:XX    ►

Schedule Update of Program(s)    Cancel

~24

VEHICLE

CROSS-REFERENCE TO RELATED APPLICATIONS

The present application claims priority from Japanese Patent Application No. 2020-162150 filed on Sep. 28, 2020, the entire contents of which are hereby incorporated by reference.

BACKGROUND

The disclosure relates to a vehicle.

In recent years, there has been proposed a technique for updating a program of an electronic control unit that controls an engine, a motor, and other vehicle-mounted devices installed in a vehicle. Hereinafter, updating a program is also referred to as reprogramming.

Reprogramming is commonly performed when a vehicle and an engine are stopped. Thus, reprogramming is performed by using electric power stored in a battery such as a 12V accessory battery (low-voltage battery) (see, for example, Japanese Unexamined Patent Application Publication No. 2018-037059).

SUMMARY

An aspect of the disclosure provides a vehicle including a high-voltage system circuit, a low-voltage system circuit, a direct current (DC)-DC converter, a controller, and a wireless communication device. The high-voltage system circuit includes a high-voltage battery. The low-voltage system circuit includes a low-voltage battery and an updater. The low-voltage battery has a lower output voltage than the high-voltage battery. The updater is configured to update a program of an update-target device by using electric power supplied from the low-voltage battery. The DC-DC converter is coupled between the high-voltage system circuit and the low-voltage system circuit and is capable of reducing in voltage output electric power of the high-voltage battery and supplying the electric power reduced in voltage to the low-voltage system circuit. The controller is configured to control the high-voltage system circuit, the low-voltage system circuit, and the DC-DC converter. The wireless communication device is configured to wirelessly communicate with an external device and receive update data for updating the program of the update-target device. The controller is configured to calculates, based on information on the update data, time taken for updating the program of the update-target device. The controller is configured to cause the DC-DC converter to reduce in voltage output electric power of the high-voltage battery and to supply the electric power reduced in voltage to the low-voltage system circuit, and thus charge the low-voltage battery in accordance with the calculated time taken for updating the program of the update-target device. The updater is configured to update the program of the update-target device by using output electric power of the low-voltage battery after the low-voltage battery is charged.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIGS. 3A and 3B are diagrams for describing how a target state of charge (SOC) of a high-voltage battery is controlled by a high-voltage battery controller in accordance with the embodiment;

FIGS. 4A, 4B, and 4C are diagrams respectively illustrating a reprogramming confirmation screen, a program selection screen, and a time-of-reprogramming setting screen in accordance with the embodiment;

DETAILED DESCRIPTION

In recent years, time taken for reprogramming tends to increase because of an increase in a program capacity or the like. If the time taken for reprogramming increases, electric power used for reprogramming increases. Thus, if electric power is not sufficiently stored in a battery at the time of reprogramming, updating of a program may be aborted because of a deficiency of electric power.

Accordingly, it is desirable to provide a vehicle capable of reducing the likelihood of updating of a program being aborted because of a deficiency of electric power.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
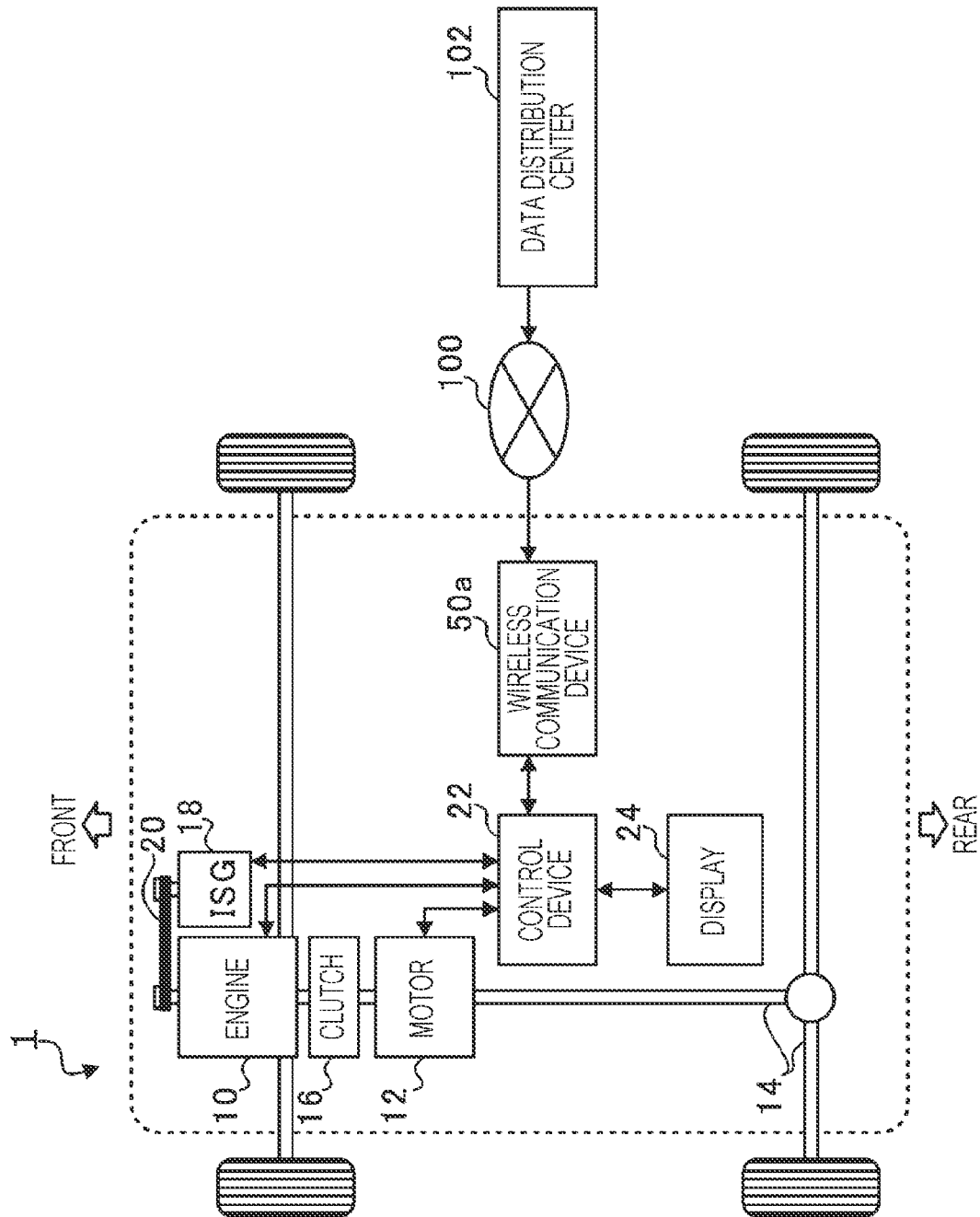
FIG. 1 is a functional block diagram for describing a vehicle in accordance with an embodiment.

FIG. 1 is a functional block diagram for describing a vehicle 1 in accordance with an embodiment. The vehicle 1 including an engine 10 and a motor 12 as driving sources for traveling is presented as an example. The vehicle 1 according to the embodiment is, for example, a so-called parallel hybrid vehicle. The engine 10 is mainly used as a motive power source to cause an output shaft 14 to rotate. The motor 12, which is a three-phase alternating current (AC) motor, is also a motive power source but merely plays a role of assisting the engine 10. A drive mode in which the engine 10 and the motor 12 are jointly used is referred to as a joint use mode.

At the time of low-speed traveling in which the speed of the engine 10 is low such as at the time when the vehicle 1 starts traveling or starts accelerating, power or torque of the engine 10 is small. Thus, a clutch 16 is released, and the drive mode is switched from the joint use mode to an electric vehicle (EV) mode in which the motor 12 alone is used as the motive power source. The drive mode is switchable from the joint use mode to the EV mode in accordance with a traveling state at the times other than the time when the vehicle 1 starts traveling or starts accelerating.

An endless member such as a belt 20 extends around an integrated starter generator (ISG) 18 and the output shaft 14 of the engine 10, so that the ISG 18 is coupled to the engine 10. Consequently, the ISG 18 functions as a starter motor that transfers motive power to the engine 10 to assist the engine 10 in starting. The ISG 18 also functions as an alternator that regenerates electric power. Conceivable timings when the engine 10 is started include not only a timing when the vehicle 1 starts traveling but also various timings such as a timing when the drive mode is switched from the EV mode to the joint use mode and a timing when the engine 10 in a non-idling state is restarted.

A control device 22 includes, for example, semiconductor integrated circuits including a central processing unit (CPU), a read-only memory (ROM) that stores a program or the like, and a random access memory (RAM) that serves as a work area. The control device 22 controls the entire vehicle 1 or various devices installed in the vehicle 1. For example, the control device 22 controls each component of an electric/electronic system circuit that includes a high-voltage battery 32 (see FIG. 2) and a low-voltage battery 42 (see FIG. 2), which will be described later.

The control device 22 is coupled to a wireless communication device 50a (see also FIG. 2) and is capable of transmitting and receiving various kinds of data to and from an external device via the wireless communication device 50a. The wireless communication device 50a is capable of wirelessly communicating with a data distribution center 102 via a network 100. The data distribution center 102 has a function of distributing reprogramming information for use in updating of a program for controlling an update-target device 44 (see FIG. 2 described later) installed in the vehicle 1. The reprogramming information includes, for example, information for designating the update-target device 44 for which reprogramming is performed, and information on update data for use in reprogramming.

The control device 22 includes an automotive navigation system controller 52a (see FIG. 2) described later. The automotive navigation system controller 52a enables various kinds of information such as map information to be displayed on a display 24 coupled to the control device 22.

Figure 2:
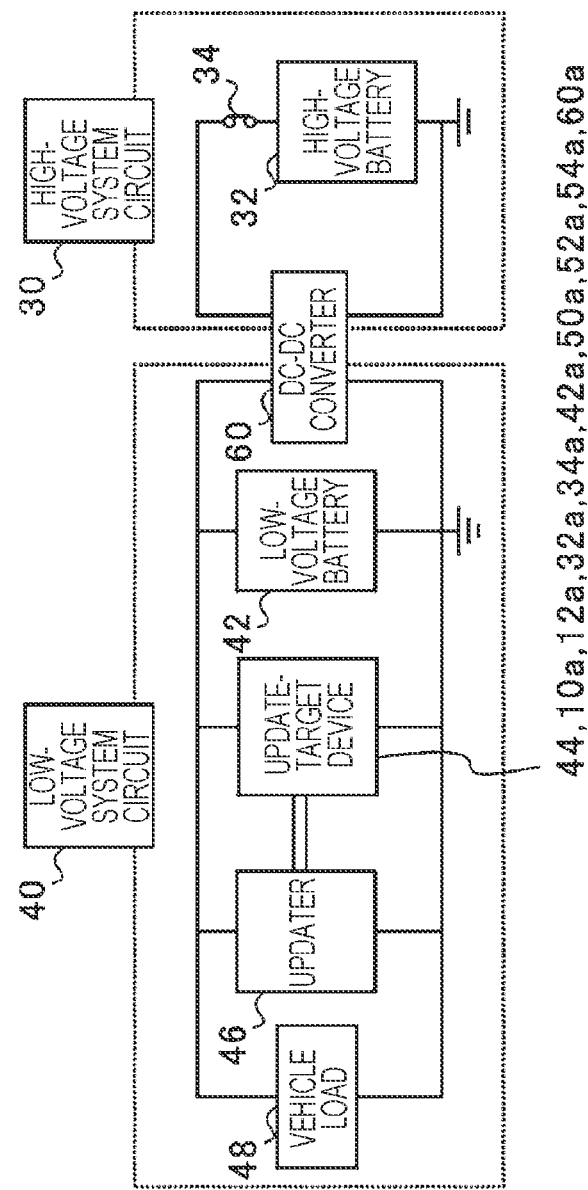
FIG. 2 is a block diagram illustrating an electric/electronic system circuit that is controlled by a control device in accordance with the embodiment.

FIG. 2 is a block diagram illustrating the electric/electronic system circuit that is controlled by the control device 22 in accordance with the embodiment. As illustrated in FIG. 2, the electric/electronic system circuit installed in the vehicle 1 includes a high-voltage system circuit 30, a low-voltage system circuit 40, and a direct current (DC)-DC converter 60. The high-voltage system circuit 30 includes the high-voltage battery 32 and a high-voltage relay 34. The high-voltage relay 34 is a relay device that switches on and off the electrical coupling of the high-voltage battery 32 in the high-voltage system circuit 30.

The low-voltage system circuit 40 includes the low-voltage battery 42, the update-target device 44, an updater 46, and a vehicle load 48. The low-voltage battery 42 is a rechargeable battery having a lower output voltage than the high-voltage battery 32. The low-voltage battery 42 is, for example, a 12V accessory battery and supplies relatively-low-voltage (for example, 12V) DC electric power to various vehicle-mounted devices (accessories) installed in the vehicle 1. The updater 46 functions as a program updating tool that performs updating of a program (reprogramming) of the update-target device 44 in accordance with an instruction of the control device 22. The updater 46 performs reprogramming of the update-target device 44 by using electric power supplied from the low-voltage battery 42. Examples of the vehicle load 48 include electrical loads such as a door-mirror motor (not illustrated), a power-window motor (not illustrated), and a radiator-fan motor (not illustrated).

In one example, the update-target device 44 is, for example, an engine controller 10a, a motor controller 12a, a high-voltage battery controller 32a, a high-voltage relay controller 34a, a low-voltage battery controller 42a, the wireless communication device 50a, the automotive navigation system controller 52a, an ignition power supply (IG power supply) controller 54a, or a DC-DC converter controller 60a. The engine controller 10a controls the engine 10. The motor controller 12a controls the motor 12. The high-voltage battery controller 32a controls the high-voltage battery 32. The high-voltage relay controller 34a controls the high-voltage relay 34. The low-voltage battery controller 42a controls the low-voltage battery 42. The wireless communication device 50a wirelessly communicates with the data distribution center 102 via the network 100. The automotive navigation system controller 52a controls an automotive navigation system. The IG power supply controller 54a controls an IG power supply of the vehicle 1 to be in an IG-ON (READY-ON) or IG-OFF (READY-OFF) state on the basis of a user operation. The DC-DC converter controller 60a controls operation of the DC-DC converter 60.

The DC-DC converter 60 is coupled between the high-voltage system circuit 30 and the low-voltage system circuit 40. The DC-DC converter 60 is capable of reducing in voltage output electric power of the high-voltage battery 32 of the high-voltage system circuit 30 and of supplying the electric power reduced in voltage to the low-voltage battery 42, the update-target device 44, the updater 46, the vehicle load 48, etc. of the low-voltage system circuit 40. That is, the DC-DC converter 60 can reduce a voltage of output electric power of the high-voltage battery 32 of the high-voltage system circuit 30 and supply the electric power with reduced voltage to the low-voltage battery 42, the update-target device 44, the updater 46, the vehicle load 48, etc. of the low-voltage system circuit 40.

The high-voltage battery controller 32a sets a target state-of-charge (SOC) range, that is, an upper-limit value and a lower-limit value, for the high-voltage battery 32, and controls charging and discharging of the high-voltage battery 32 in accordance with this target SOC range. In one example, the high-voltage battery controller 32a controls charging and discharging of the high-voltage battery 32 such that the SOC of the high-voltage battery 32 is within the range defined by the aforementioned target SOC upper-limit and lower-limit values.

FIGS. 3A and 3B are diagrams for describing how the target SOC of the high-voltage battery 32 is controlled by the high-voltage battery controller 32a. As illustrated in FIG. 3A, at normal time when no reprogramming is scheduled, the high-voltage battery controller 32a sets, as the target SOC range, a normal SOC upper-limit value and a normal SOC lower-limit value. For example, the normal SOC upper-limit value may be set to 90% of the fully charged state of the high-voltage battery 32 which is represented as 100%. For example, the normal SOC lower-limit value may be set to 50% of the fully charged state of the high-voltage battery 32 which is represented as 100%. The normal SOC upper-limit and lower-limit values are not limited to these specific examples.

In response to the wireless communication device 50a receiving reprogramming information from the data distribution center 102 via the network 100, the high-voltage battery controller 32a changes the SOC lower-limit value of the target SOC range of the high-voltage battery 32 to a value (scheduled reprogramming preparation value) that is higher than the normal lower-limit value (normal SOC lower-limit value). The high-voltage battery controller 32a sets the SOC upper-limit value to the normal SOC upper-limit value.

In one example, in response to the wireless communication device 50a receiving reprogramming information from the data distribution center 102 via the network 100, the control device 22 calculates time taken for reprogramming of the update-target device 44 (hereinafter, also referred to as "time for reprogramming") on the basis of the received reprogramming information. The control device 22 calculates the longest time taken for charging the low-voltage battery 42 by using the high-voltage battery 32 (hereinafter, also referred to as "time for charging") on the basis of the calculated time for reprogramming.

In one example, the reprogramming information includes various kinds of information such as a program capacity for the update-target device 44, a write speed of writing the update program to the update-target device 44, electric power consumption per unit time during reprogramming, and a communication speed between the updater 46 and the update-target device 44, for example. The control device 22 calculates the time for reprogramming on the basis of all or some of these various kinds of information.

For example, the control device 22 divides the program capacity for the update-target device 44 by the communication speed between the updater 46 and the update-target device 44 to calculate time taken for transferring the update program from the updater 46 to the update-target device 44. The control device 22 also divides the program capacity for the update-target device 44 by the write speed of writing the update program to the update-target device 44 to calculate time taken for writing the update program to the update-target device 44. The control device 22 then adds these times together to calculate the time for reprogramming. The control device 22 also estimates electric power used for reprogramming from the time for reprogramming, and calculates the time for charging on the basis of this estimated electric power.

If the wireless communication device 50a receives a plurality of pieces of reprogramming information from the data distribution center 102 via the network 100, the control device 22 calculates time taken for reprogramming of the update-target device 44 (time for reprogramming) on the basis of each of the plurality of pieces of received reprogramming information. The control device 22 also calculates time for charging on the basis of each calculated time for reprogramming.

On the basis of the calculated time for reprogramming, the high-voltage battery controller 32a of the control device 22 changes the target SOC lower-limit value of the high-voltage battery 32 to the scheduled reprogramming preparation value that is higher than the normal value as illustrated in FIG. 3B. For example, the high-voltage battery controller 32a sets the target SOC lower-limit value of the high-voltage battery 32 to the scheduled reprogramming preparation value (for example, 70% of the fully charged state) that is higher than the normal value (for example, 50% of the fully charged state). Consequently, charging of the high-voltage battery 32 is controlled by the high-voltage battery controller 32a such that the SOC of the high-voltage battery 32 is higher than or equal to the scheduled reprogramming preparation value that is higher than the normal value. In some embodiments, the target SOC lower-limit value (scheduled reprogramming preparation value) is set to a larger value as the calculated time for reprogramming becomes larger. Consequently, the high-voltage battery 32 is sufficiently charged and a charge level higher than or equal to the electric power used for reprogramming can be ensured. Thus, a deficiency of electric power is successfully avoided.

In the embodiment, the high-voltage battery controller 32a calculates the time for reprogramming the update-target device 44 on the basis of the reprogramming information. The high-voltage battery controller 32a changes the target SOC lower-limit value of the high-voltage battery 32 on the basis of the calculated time for reprogramming. However, the embodiment of the disclosure is not limited to this. For example, in response to the wireless communication device 50a receiving reprogramming information from the data distribution center 102 via the network 100, the high-voltage battery controller 32a may set a predetermined SOC lower-lower limit value as the target SOC lower-limit value (scheduled reprogramming preparation value) of the high-voltage battery 32. For example, the SOC lower-limit value serving as the scheduled reprogramming preparation value may be set in advance to 70% of the fully charged state of the high-voltage battery 32 which is represented as 100%.

Alternatively, the reprogramming information may include time information that includes the time taken for reprogramming of the update-target device 44. In this case, the high-voltage battery controller 32a changes the target SOC lower-limit value of the high-voltage battery 32 on the basis of the time information. For example, the data distribution center 102 may divide the program capacity for the update-target device 44 by the communication speed between the updater 46 and the update-target device 44 to calculate time taken for transferring the update program from the updater 46 to the update-target device 44 in advance. The data distribution center 102 may also divide the program capacity for the update-target device 44 by the write speed of writing the update program to the update-target device 44 to calculate time taken for writing the update program to the update-target device 44 in advance. The data distribution center 102 may then include, as the time information in the reprogramming information, time obtained by adding these times together in advance.

The high-voltage battery controller 32a then changes the target SOC lower-limit value of the high-voltage battery 32 to the scheduled reprogramming preparation value. The high-voltage battery 32 is charged to a charge level that is higher than or equal to the scheduled reprogramming preparation value. In response to a user operation (IG-OFF operation) for setting the vehicle 1 to READY-OFF in the case where the reprogramming information has already been received, the updater 46 checks the charge level of the high-voltage battery 32.

FIGS. 4A, 4B, and 4C are diagrams respectively illustrating a reprogramming confirmation screen 24a, a program selection screen 24b, and a time-of-reprogramming setting screen 24c in accordance with the embodiment. If the charge level of the high-voltage battery 32 is higher than or equal to the scheduled reprogramming preparation value and reprogramming is yet to be scheduled, the automotive navigation system controller 52a causes the reprogramming confirmation screen 24a to be displayed on the display 24 as illustrated in FIG. 4A. The reprogramming confirmation screen 24a prompts the user to confirm that reprogramming is to be performed.

In the reprogramming confirmation screen 24a, for example, a warning message "Once reprogramming starts, the vehicle 1 is not usable until reprogramming ends" and button images that allow the user to select whether to perform reprogramming (Yes or No) are displayed.

In response to the user pressing the "Yes" button in the reprogramming confirmation screen 24a to permit reprogramming, the automotive navigation system controller 52a causes the program selection screen 24b to be displayed on the display 24 as illustrated in FIG. 4B. The program selection screen 24b allows the user to select the update-target device 44 for which reprogramming is performed.

In the program selection screen 24b, for example, expected times for the respective update-target devices 44 for which reprogramming is performed, checkboxes that allow the user to select the update-target device(s) 44 for which reprogramming is performed, and button images ("Select Program(s)" and "Cancel") that allow the user to select whether to confirm the operation for selecting the update-target device(s) 44 are displayed. The expected time for each update-target device 44 for which reprogramming is performed is time obtained by adding the time for reprogramming and the time for charging that are calculated for the update-target device 44 by the control device 22.

In response to the user pressing the "Select Program(s)" button in the program selection screen 24b, the automotive navigation system controller 52a causes the time-of-reprogramming setting screen 24c to be displayed on the display as illustrated in FIG. 4C. The time-of-reprogramming setting screen 24c allows the user to select the time at which reprogramming is to be performed.

In the time-of-reprogramming setting screen 24c, for example, expected total time, time (hereinafter, also referred to as time of reprogramming) at which reprogramming is to be performed, and button images ("Schedule Update of Program(s)" and "Cancel") that allow the user to select whether to confirm the schedule for reprogramming of the update-target devices 44 are displayed. The expected total time is the sum of the expected times for the respective update-target devices 44 that are selected by the user in the program selection screen 24b as targets for which reprogramming is to be performed. The time of reprogramming can be selected by the user.

In the case where the user presses the "Schedule Update of Program(s)" button in the time-of-reprogramming setting screen 24c, in response to the current time reaching the scheduled time, a reprogramming operation starts. On the other hand, in the case where the "Schedule Update of Program(s)" button is not pressed by the user in the time-of-reprogramming setting screen 24c, that is, the "No" button is pressed in the reprogramming confirmation screen 24a, the "Cancel" button is pressed in the program selection screen 24b, or the "Cancel" button is pressed in the time-of-reprogramming setting screen 24c, the reprogramming operation does not start.

In response to the start of the reprogramming operation after the current time reaches the scheduled time, the IG power supply controller 54a of the control device 22 switches on the IG power supply without a user operation and controls the vehicle 1 to be in the READY-ON (IG-ON) state. If reprogramming of the update-target device 44 can be performed by using the low-voltage battery 42, the updater 46 performs reprogramming of the update-target device 44 by using electric power of the low-voltage battery 42.

On the other hand, if the charge level of the low-voltage battery 42 is not sufficient and reprogramming of the update-target device 44 is unable to be performed by using the low-voltage battery 42, in order to charge the low-voltage battery 42 by using the high-voltage battery 32, the high-voltage relay controller 34a brings the high-voltage relay 34 into a coupled state to enable electric power of the high-voltage battery 32 to be output to the DC-DC converter 60. The DC-DC converter controller 60a causes the DC-DC converter 60 to start operating, to reduce in voltage electric power output from the high-voltage battery 32, and to supply the electric power reduced in voltage to the low-voltage system circuit 40. After charging of the low-voltage battery 42 ends, electric power supply from the high-voltage battery 32 is stopped. Reprogramming of the update-target device 44 (designated device) is performed by using electric power of the low-voltage battery 42.

In one example, the low-voltage battery controller 42a charges the low-voltage battery 42 until the charge level of the low-voltage battery 42 becomes equal to a level with which reprogramming of all the update-target devices 44 selected by the user in the program selection screen 24b can be performed. At this time, the low-voltage battery controller 42a can determine the charge level of the low-voltage battery 42 on the basis of the sum of the times for reprogramming the respective update-target devices 44 selected by the user in the program selection screen 24b. The configuration is not limited to such an example. The low-voltage battery controller 42a may charge the low-voltage battery 42 to a predetermined charge level set in advance. For example, this predetermined charge level may be set in advance to 90% of the fully charged state of the low-voltage battery 42 which is represented as 100%.

In response to the completion of charging of the low-voltage battery 42, the DC-DC converter controller 60a ends the operation of the DC-DC converter 60 and the high-voltage relay controller 34a breaks the coupling of the high-voltage relay 34. Then, the updater 46 performs reprogramming of the update-target device 44 by using electric power of the low-voltage battery 42 that has been charged. In response to the end of reprogramming of the update-target device 44, the IG power supply controller 54a of the control device 22 controls the vehicle 1 to be in the READY-OFF (IG-OFF) state without a user operation.

Control Method

Figure 5:
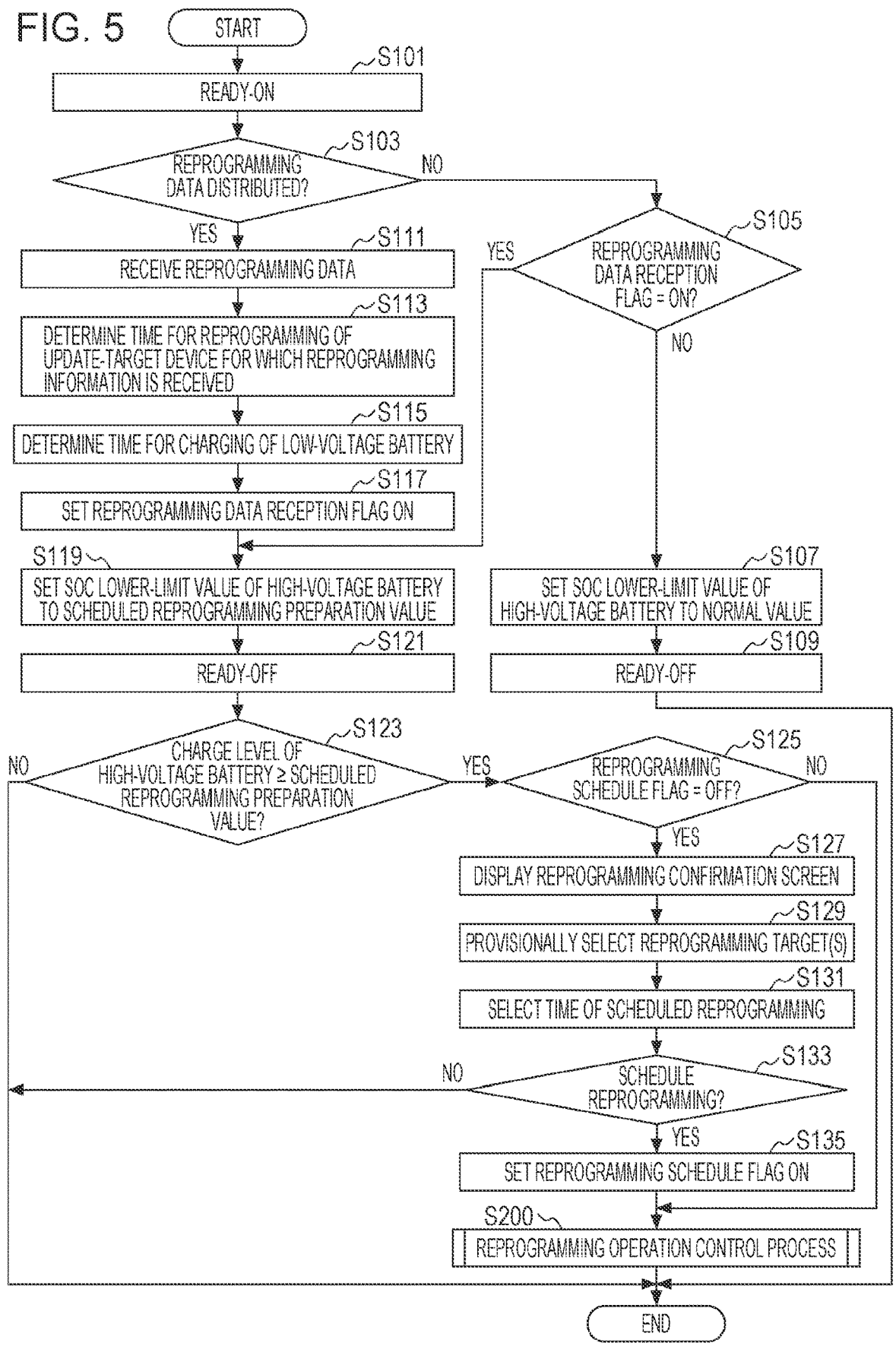
FIG. 5 is a flowchart for describing a control process performed in relation to reprogramming in the vehicle in accordance with the embodiment.

FIG. 5 is a flowchart for describing a control process performed in relation to reprogramming in the vehicle 1 in accordance with the embodiment. FIG. 5 illustrates an overall processing flow in the vehicle 1.

As illustrated in FIG. 5, in response to a user operation, the IG power supply controller 54a of the control device 22 switches on the IG power supply and controls the vehicle 1 to be in the READY-ON (IG-ON) state (step S101).

The control device 22 wirelessly communicates with the data distribution center 102 via the wireless communication device 50a and checks whether reprogramming data yet to be received by the vehicle 1 of interest is present in reprogramming data distributed from the data distribution center 102 (step S103). The reprogramming data is data including update data for updating a program of the update-target device 44. The data distribution center 102 distributes reprogramming information including the reprogramming data for performing reprogramming to each vehicle 1 via the network 100 when it is desirable to perform reprogramming of the update-target device 44.

If it is determined in S103 that yet-to-be-received reprogramming data is not present (NO in step S103), the control device 22 determines whether a reprogramming data reception flag is on (step S105). If the reprogramming data reception flag is on, the vehicle 1 of interest has already received reprogramming data but reprogramming is yet to be performed in accordance with the reprogramming data. Thus, the reprogramming data reception flag indicates a state in which reprogramming is to be performed (reprogramming is scheduled).

If it is determined in S105 that the reprogramming data reception flag is off (NO in step S105), reprogramming is not to be performed. Thus, the high-voltage battery controller 32a sets the SOC lower-limit and lower-limit values of the high-voltage battery 32 to the normal values (step S107). As a result of this, the high-voltage battery 32 is charged within the normal target SOC range during traveling of the vehicle 1 thereafter (see FIG. 3A).

The IG power supply controller 54a of the control device 22 then controls the vehicle 1 to be in the READY-OFF (IG-OFF) state in response to a user operation (step S109). The control process then ends.

On the other hand, if it is determined in step S105 that the reprogramming data reception flag is on (YES in step S105), the process proceeds to S119 (described below).

If it is determined in step S103 that the yet-to-be-received reprogramming data is present and the reprogramming data is to be received from the data distribution center 102 (YES in step S103), the control device 22 receives reprogramming information including the reprogramming data from the data distribution center 102 via the network 100 and the wireless communication device 50a (step S111).

On the basis of the reprogramming information received from the data distribution center 102, the control device 22 calculates the time for reprogramming of the update-target device 44 for which the reprogramming information is received (step S113). On the basis of the calculated time for reprogramming, the control device 22 calculates time for charging that is the longest time taken for charging the low-voltage battery 42 by using the high-voltage battery 32 (step S115). The control device 22 sets the reprogramming data reception flag on (step S117). The reprogramming data reception flag is not set off until reprogramming is completed for all the received pieces of reprogramming data.

If it is determined in step S105 that the reprogramming data reception flag is on (YES in step S105) or if the reprogramming data reception flag is set on in step S117, the high-voltage battery controller 32a of the control device 22 changes the set target SOC lower-limit value of the high-voltage battery 32 to the scheduled reprogramming preparation value that is higher than the normal value and sets the SOC upper-limit value to the normal value on the basis of the time for reprogramming calculated in step S113 (step S119). As a result of this, the high-voltage battery 32 is charged within a special target SOC range during traveling of the vehicle 1 thereafter (see FIG. 3B).

For example, in the case where the vehicle 1 stops, the IG power supply controller 54a of the control device 22 controls the vehicle 1 to be in the READY-OFF (IG-OFF) state in response to a user operation (step S121).

The control device 22 checks the charge level of the high-voltage battery 32 and determines whether the charge level (actual SOC) of the high-voltage battery 32 is higher than or equal to the scheduled reprogramming preparation value (target SOC lower-limit value) (step S123).

If it is determined that the charge level of the high-voltage battery 32 is higher than or equal to the scheduled reprogramming preparation value (YES in step S123), the control device 22 determines whether a reprogramming schedule flag is off (step S125). If the reprogramming schedule flag is on (NO in step S125), the reprogramming schedule flag indicates that reprogramming is scheduled by the user through a user operation. If it is determined that the reprogramming schedule flag is off (YES in step S125), the automotive navigation system controller 52a of the control device 22 causes the display 24 to display the reprogramming confirmation screen 24a (see FIG. 4A) (step S127), the program selection screen 24b (see FIG. 4B) (step S129), and the time-of-reprogramming setting screen 24c (see FIG. 4C) (step S131) in response to a user operation.

The control device 22 determines whether the "Schedule Update of Program(s)" button is operated by the user in the time-of-reprogramming setting screen 24c (step S133). If it is determined that the "Schedule Update of Program(s)" button is operated in the time-of-reprogramming setting screen 24c and reprogramming is scheduled by the user (YES in step S133), the control device 22 sets the reprogramming schedule flag on (step S135).

If the "Schedule Update of Program(s)" button is not operated by the user in the time-of-reprogramming setting screen 24c in S133 (NO in step S133) or if it is determined in step S123 that the charge level of the high-voltage battery 32 is lower than the scheduled reprogramming preparation value (NO in step S123), the control device 22 ends the process without performing the reprogramming operation.

On the other hand, if it is determined in step S125 that the reprogramming schedule flag is on or if the reprogramming schedule flag is set on in step S135, the process proceeds to a reprogramming operation control process (step S200). The reprogramming operation control process (step S200) will be described in detail later.

Reprogramming Operation Control Process

Figure 6:
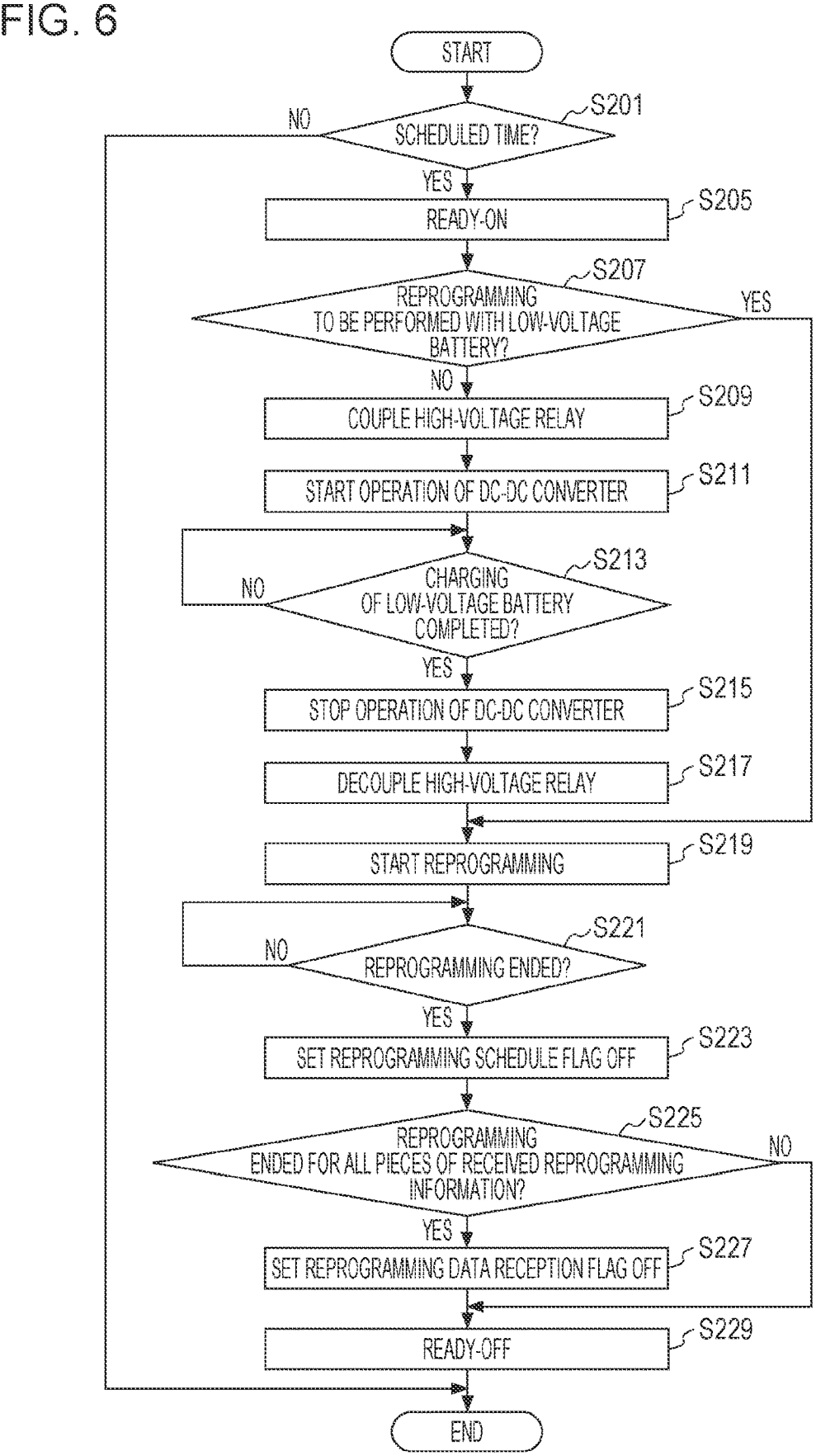
FIG. 6 is a flowchart for describing a reprogramming operation control process performed in the vehicle in accordance with the embodiment.

FIG. 6 is a flowchart for describing the reprogramming operation control process (step S200 in FIG. 5) performed in the vehicle 1 in accordance with the embodiment.

As illustrated in FIG. 6, the control device 22 determines whether the current time is the scheduled time set by the user in the time-of-reprogramming setting screen 24c (step S201).

If it is determined in step S201 that the current time is not the scheduled time set by the user in the time-of-reprogramming setting screen 24c (NO in step S201), the process ends.

If it is determined in step S201 that the current time is the scheduled time set by the user in the time-of-reprogramming setting screen 24c (YES in step S201), the IG power supply controller 54a of the control device 22 switches on the IG power supply without a user operation and controls the vehicle 1 to be in the READY-ON (IG-ON) state (step S205).

The control device 22 checks the charge level of the low-voltage battery 42 and determines whether the charge level of the low-voltage battery 42 is higher than or equal to an electric power level used in reprogramming of the update-target device 44, that is, whether reprogramming can be performed by using the low-voltage battery 42 (step S207).

If it is determined that reprogramming cannot be performed by using the low-voltage battery 42 (NO in step S207), the high-voltage relay controller 34a of the control device 22 brings the high-voltage relay 34 into a coupled state (step S209). The DC-DC converter controller 60a causes the DC-DC converter 60 to operate, to reduce in voltage the electric power output from the high-voltage battery 32, and to supply the electric power reduced in voltage to the low-voltage system circuit 40 (step S211). As a result of this, the low-voltage battery 42 can be charged by using electric power supplied from the high-voltage battery 32.

The low-voltage battery controller 42a of the control device 22 determines whether charging of the low-voltage battery 42 by using electric power output from the high-voltage battery 32 is completed (step S213). In one example, the low-voltage battery controller 42a charges the low-voltage battery 42 until the charge level of the low-voltage battery 42 becomes equal to a level with which reprogramming of all the update-target devices 44 selected by the user in the program selection screen 24b can be performed.

If it is determined that charging of the low-voltage battery 42 is completed (YES in step S213), the DC-DC converter controller 60a of the control device 22 causes the DC-DC converter 60 to stop operating (step S215) and the high-voltage relay controller 34a breaks the coupling of the high-voltage relay 34 (step S217).

After the coupling of the high-voltage relay 34 is broken in step S217 or if it is determined in step S207 that reprogramming can be performed by using the low-voltage battery 42 (YES in step S207), the control device 22 instructs the updater 46 to perform reprogramming and the updater 46 performs reprogramming of the update-target device 44 by using electric power supplied from the low-voltage battery 42 (step S219). In response to the end of the reprogramming (YES in step S221), the control device 22 sets the reprogramming schedule flag off (step S223).

The control device 22 determines whether reprogramming is finished for all the pieces of reprogramming information received in step S111 (step S225). If it is determined in step S225 that reprogramming is finished for all the pieces of received reprogramming information (YES in step S225), the control device 22 sets the reprogramming data reception flag off (step S227).

After the reprogramming data reception flag is set off in step S227 or if it is determined in step S225 that reprogramming is not finished for all the pieces of received reprogramming information, the IG power supply controller 54a of the control device 22 controls the vehicle 1 to be in the READY-OFF (IG-OFF) state without a user operation (step S229). The control process then ends.

As described above, in the embodiment, in response to receipt of reprogramming data, the target SOC lower-limit value is changed to a value higher than the normal value. Thus, the likelihood of reprogramming being aborted because of a deficiency of remaining electric power of the high-voltage battery 32 or the low-voltage battery 42 during reprogramming is reduced. Such a beneficial effect will be described in detail below.

In the related art, electric power used when reprogramming is performed is commonly supplied by the low-voltage battery 42. However, for example, when the SOC of the low-voltage battery 42 is low, electric power used in reprogramming may be deficient. If reprogramming is aborted because of a deficiency of electric power, this may adversely affect the normal operation of the vehicle 1, which may lead to replacement of the update-target device 44 subjected to reprogramming according to circumstances.

On the other hand, in the case where reprogramming data is received via wireless communication and reprogramming is performed on the basis of the received reprogramming data, if the vehicle 1 is coupled to an external power supply with a cable, the convenience is reduced. Thus, it is not desirable to supply electric power from an external power supply when reprogramming is performed.

Accordingly, it is conceivable to reduce in voltage the output power of the high-voltage battery 32 and use the power reduced in voltage in reprogramming when electric power of the low-voltage battery 42 used in reprogramming is deficient in an electric-powered vehicle (HEV or EV) equipped with the high-voltage battery 32 for driving the motor. However, if the SOC of the high-voltage battery 32 is low at the start of reprogramming, reprogramming is not to be performed. For example, in the case of a parallel hybrid vehicle in which the high-voltage battery 32 is not charged while the vehicle is stopped, this issue tends to occur.

Accordingly, in the embodiment, in response to reprogramming of the update-target device 44 being scheduled, the control device 22 changes the target SOC lower-limit value of the high-voltage battery 32 to a value (scheduled reprogramming preparation value) that is higher than the normal lower-limit value (normal SOC lower-limit value) as described above. Consequently, the high-voltage battery 32 can have a charge level sufficient for performing reprogramming when reprogramming is performed. Thus, the likelihood of reprogramming being aborted because of a deficiency of electric power is successfully reduced.

As described above, in response to the wireless communication device 50a receiving reprogramming data for the update-target device 44, the control device 22 determines that reprogramming of the update-target device 44 is scheduled. Consequently, the target SOC lower-limit value of the high-voltage battery 32 can be quickly changed to the scheduled reprogramming preparation value. Thus, when the vehicle 1 is controlled to be in the IG-OFF state after reprogramming is scheduled, the high-voltage battery 32 is in a sufficiently charged state.

As described above, in response to the wireless communication device 50a receiving reprogramming data, the control device 22 calculates time taken for reprogramming of the update-target device 44 on the basis of the reprogramming data, and charges the low-voltage battery 42 in accordance with the calculated time. After the low-voltage battery 42 is charged, the updater 46 updates the program of the update-target device 44 by using output electric power of the low-voltage battery 42. Consequently, a deficiency of electric power can be avoided when reprogramming is performed.

As described above, the control device 22 calculates the time taken for reprogramming of the update-target device 44 on the basis of at least one of a program capacity of update data, a communication speed between the updater 46 and the update-target device 44, or a write speed of writing an update program to the update-target device 44. Consequently, the time taken for reprogramming of the update-target device 44 can be accurately calculated.

As described above, in the case where there are the plurality of update-target devices 44, the control device 22 calculates time taken for reprogramming of the plurality of update-target devices 44, and charges the low-voltage battery 42 in accordance with the calculated time taken for updating programs for the plurality of update-target devices 44. Consequently, reprogramming can be performed collectively for all the update-target devices 44 selected by the user in the program selection screen 24b. Thus, reprogramming can be efficiently performed.

The embodiment of the disclosure has been described above with reference to the accompanying drawings. It is needless to say that the disclosure is not limited to such an embodiment. It is obvious that a person skilled in the art can conceive various alterations and modifications within a scope of the claims. It is to be understood that these alterations and modifications are, of course, included in the technical scope of the disclosure.

In the embodiment described above, if reprogramming cannot be performed because the vehicle 1 is traveling or the like when the current time reaches the time set by the user in the time-of-reprogramming setting screen 24c, the reprogramming confirmation screen 24a, the program selection screen 24b, and the time-of-reprogramming setting screen 24c may be displayed again after the vehicle 1 is stopped to prompt the user to reschedule the reprogramming.

In the embodiment described above, if a communication fee is charged when the wireless communication device 50a receives reprogramming information from the data distribution center 102 via the network 100, a screen for asking the user to give permission to receive the reprogramming information from the data distribution center 102 via the network 100 may be displayed on the display 24.

In the embodiment described above, in the case where the wireless communication device 50a receives reprogramming information from the data distribution center 102 via the network 100 in advance and the "Schedule Update of Program(s)" button is pressed by the user in the time-of-reprogramming setting screen 24c, in response to the current time reaching the scheduled time, charging of the low-voltage battery 42 and reprogramming of the update-target device 44 are started. However, the disclosure is not limited to this. In one embodiment, the timing at which the wireless communication device 50a receives the reprogramming information may be upon the current time reaching the scheduled time selected by the user in the time-of-reprogramming setting screen 24c. In this case, the expected time displayed in the program selection screen 24b is time obtained by adding time taken by the wireless communication device 50a to receive the reprogramming information from the data distribution center 102 via the network 100 to the sum of the time for reprogramming and the time for charging that are calculated by the control device 22 for each update-target device 44.

In the embodiment described above, in the case where the reprogramming information is received and reprogramming is scheduled, the high-voltage battery controller 32a changes the target SOC lower-limit value of the high-voltage battery 32 to a value (scheduled reprogramming preparation value) that is higher than the normal value and sets the SOC upper-limit value to the normal value. However, the disclosure is not limited to such an example. The high-voltage battery controller 32a may change the target SOC upper-limit value of the high-voltage battery 32 to a value that is higher than the normal value and also change the target SOC lower-limit value of the high-voltage battery 32 to a value (scheduled reprogramming preparation value) that is higher than the normal value.

In the embodiment described above, the case where the vehicle 1 is a parallel hybrid vehicle has been described. However, the disclosure is not limited to this. The disclosure is applicable to various vehicles such as an EV, a plug-in hybrid vehicle (PHEV), and a non-plug-in hybrid vehicle (hybrid vehicle).

The control device 22 illustrated in FIG. 1 and the updater 46 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control device 22 including the high-voltage battery controller 32a, the high-voltage relay controller 34a, the low-voltage battery controller 42a, the automotive navigation system controller 52a, the IG power supply controller 54a, and the DC-DC converter controller 60a and to perform all or a part of functions of the updater 46. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIGS. 1 and 2.

The invention claimed is:

1. A vehicle comprising:
a high-voltage system circuit comprising
a high-voltage battery;
a low-voltage system circuit comprising
a low-voltage battery having a lower output voltage than the high-voltage battery, and
an updater configured to update a program of an update-target device by using electric power supplied from the low-voltage battery;
a direct current (DC)-DC converter coupled between the high-voltage system circuit and the low-voltage system circuit and capable of reducing in voltage output electric power of the high-voltage battery and supplying the electric power reduced in voltage to the low-voltage system circuit;
a controller configured to control the high-voltage system circuit, the low-voltage system circuit, and the DC-DC converter; and
a wireless communication device configured to wirelessly communicate with an external device and receive update data for updating the program of the update-target device,
wherein the controller is configured to
calculate, based on information on the update data, time taken for updating the program of the update-target device, and
cause the DC-DC converter to reduce in voltage the output electric power of the high-voltage battery and to supply the electric power reduced in voltage to the low-voltage system circuit, and thus charge the low-voltage battery in accordance with the calculated time taken for updating the program of the update-target device, and
wherein the updater is configured to update the program of the update-target device by using output electric power of the low-voltage battery after the low-voltage battery is charged.

2. The vehicle according to claim 1, wherein the controller is configured to calculate the time taken for updating the program of the update-target device, based on at least one of a program capacity of the update data, a communication speed between the updater and the update-target device, or a write speed of writing update program to the update-target device.

3. The vehicle according to claim 1, wherein the controller is configured to, in a case where there are a plurality of the update-target devices, calculate time taken for updating the programs of the plurality of update-target devices.

4. The vehicle according to claim 2, wherein the controller is configured to, in a case where there are a plurality of the update-target devices, calculate time taken for updating the programs of the plurality of update-target devices.

5. The vehicle according to claim 1, further comprising:
an engine serving as a driving source for traveling; and
a motor coupled to the high-voltage battery and serving as a driving source for traveling.

6. The vehicle according to claim 2, further comprising:
an engine serving as a driving source for traveling; and
a motor coupled to the high-voltage battery and serving as a driving source for traveling.

7. The vehicle according to claim 3, further comprising:
an engine serving as a driving source for traveling; and
a motor coupled to the high-voltage battery and serving as a driving source for traveling.

8. The vehicle according to claim 4, further comprising:
an engine serving as a driving source for traveling; and
a motor coupled to the high-voltage battery and serving as a driving source for traveling.

\* \* \* \* \*